United States Patent [19]

Siems

[11] 3,894,222

[45] July 8, 1975

[54] APPARATUS FOR SUPPRESSING NOISE SPIKES

[75] Inventor: Lee E. Siems, Houston, Tex.

[73] Assignee: Digital Data Systems, Inc., Houston, Tex.

[22] Filed: June 3, 1974

[21] Appl. No.: 475,471

[52] U.S. Cl. .......... 235/151.3; 235/152; 340/15.5 F
[51] Int. Cl. ...................... G06f 7/00; G01v 1/36
[58] Field of Search ... 235/151.3, 181, 152, 151.31; 324/.5 A, 77 B; 340/15.5 F, 15.5 CC

[56] References Cited
UNITED STATES PATENTS

| | | | |
|---|---|---|---|
| 3,182,181 | 5/1965 | Schumann | 235/164 |
| 3,446,949 | 5/1969 | Trimble | 235/152 |
| 3,484,591 | 12/1969 | Trimble | 235/152 |
| 3,557,354 | 1/1971 | Trimble | 235/152 |
| 3,720,816 | 3/1973 | Keller et al. | 235/151.3 |
| 3,763,362 | 10/1973 | Griem, Jr. | 235/151.31 |

*Primary Examiner*—Eugene G. Botz
*Assistant Examiner*—Edward J. Wise
*Attorney, Agent, or Firm*—Michael P. Breston

[57] ABSTRACT

An apparatus for suppressing extreme-valued members of a discrete time series that consists of a set of floating-point numbers, each floating-point number having an algebraic sign, a true exponent, and a mantissa. The apparatus comprises a digital integrator means adapted to receive at its input the true exponents of the floating-point numbers to integrate them with respect to time. The integrator provides at its output an instantaneous value of the integrated exponents. Means are provided to add a preselected threshold quantity to the present value of the integrated exponents. Comparator means compare the true exponents with the sum of the present value of the integrated exponents plus threshold and select the lesser of the two compared quantities to define a scaled exponent.

5 Claims, 2 Drawing Figures

APPARATUS FOR SUPPRESSING NOISE SPIKES

BACKGROUND OF THE INVENTION

This invention relates to the art of noise reduction by summation and scaling processes. For example, in seismographic exploration of the earth's subsurface, an energy source injects a seismic signal into the earth. The signal propagates downwardly and becomes reflected from various subsurface earth layers which act as reflectors. The reflected signals return to the surface of the earth where the signals are detected and converted to electrical signals. The electrical signals are sent through a multi-channel transmission link to a signal processor. The signal processor may include a clock, amplifiers, filters, a summer, a correlator, and a seismic data recorder using magnetic tape.

In the signal processor, the clock measures the round-trip travel time required for a seismic signal to propagate from the earth's surface to one or more reflectors and back to the earth's surface. The round-trip travel times are proportional to the depths of the respective reflectors. Typically, the travel time to a deep reflecting layer may be several seconds. Reflections from shallower layers arrive proportionately sooner.

A recording or data-acquisition cycle includes the steps of injecting a seismic signal into the earth, detecting the reflected signals, processing the signals by a signal processing device, and recording the processed data on a magnetic tape. Recording-cycle length ranges from 6 to 15 or more seconds.

In one method of seismic exploration, the source of seismic energy is a sweep-generator or vibrator. The sweep signal is a unique wavetrain that is non-repetitive during a period at least as long as the maximum reflection travel-time delay. See, for example, U.S. Pat. No. 2,688,124 for a description of this method of exploration.

Reflected seismic signals resulting from the injected sweep form a complex wave train consisting of successively overlapping images of the original sweep signal. Each of the overlapping images will be delayed in time in proportion to the depths to respective reflectors.

Useful information can be obtained from the complex wavetrains by cross-correlating a replica of the original sweep signal with the detected complex reflected wavetrain. The end result is a correlogram. Although a correlogram can be produced by analog means, modern practice employs digital methods. In accordance with the above method, the sweep replica and the reflected seismic wavetrain are periodically sampled and quantized as a series of floating-point numbers. A floating-point number consists of an algebraic sign, an exponent to a number base, and a mantissa. Seismic signals have a wide dynamic range of 120 db or more. The mantissa is a fraction less than one; hence, the full dynamic range of the signals is expressed to a close approximation by the exponents. Large signals have large exponents and small signals have small exponents.

Digital crosscorrelation is conveniently performed in a special-purpose, hard-wired computer. Methods and apparatus for crosscorrelating seismic signals are described in my copending application, Ser. No. 218,259, now U.S. Pat. No. 3,863,057, assigned to the same assignee, and also in application, Ser. No. 218,284, now U.S. Pat. No. 3,863,058. In the 218,284 application, the sweep replica and reflected seismic wavetrain, in the form of two discrete time series of floating-point numbers, are correlated using the exponents only. The two time series to be correlated are correlated by adding the corresponding exponents of the numbers which in their full form would have had to have been multiplied.

Seismic signals generated by a vibrator are low-level; that is, they are relatively weak and become embedded in ambient noise due to wind, thermal electronic noise, microseisms, etc. To improve the signal-to-noise ratio, a number of reflected wavetrains may be summed together. Typically a summation may include 16 to 20 separate sweep signals, generated at the same or closely adjacent locations on the earth's surface. The step of correlation may be performed upon the final summation or upon the individual sweeps. If correlation is done on individual sweep signals, the resulting correlograms may themselves be summed.

In addition to the ambient noise, occasional high-level, short-term noise spikes may occur. Noise spikes are transients that may persist for 100 ms or less and whose level is many hundreds or even thousands of times as high as the desired seismic signals. Such transients may be due to vehicular traffic, nearby aircraft, humans or animals walking near the geophones, lightening discharges, or the like. Because of their isolated occurrences and high signal levels, noise spikes are not attenuated by statistical cancellation as is the ambient noise. Instead, inclusion of a high-level transient in a summation or correlation seriously contaminates the end result.

Automatic gain controls (AGC) have been proposed for the purpose of attenuating noise spikes. However, because of the wide dynamic range of the seismic signals themselves and the time lags inherent in AGC circuits, AGC action has an adverse effect upon the desired seismic signals without materially reducing the level of the undesired transients.

There is a need, therefore, for a means to recognize and to scale downwardly high-level transients superimposed upon a desired low-level wavetrain. It is important not to disturb desired signals occurring immediately before and after the arrival of the transient.

SUMMARY OF THE INVENTION

An apparatus is provided to suppress transients or extreme-valued samples that may appear in a discrete time series as a result of noise spikes. The absolute values of the exponents are separated from their corresponding signs and mantissas. The separated exponents are integrated over the duration of the wavetrain. At each sample interval, the true exponent of a quantized sample is compared with the corresponding present value of the integrated exponents plus a threshold. The lesser of the two compared quantities becomes the scaled exponent.

Let the true exponent be represented by $Ex_{(j)}$; let the present value of the integrated exponents be represented by $\overline{Ex}_{(j-1)}$; and let T define the threshold quantity.

If $Ex_{(j)} \leq (\overline{Ex}_{(j-1)} + T)$ then $$Es_{(j)} = Ex_{(j)}^1$$

where $Es_{(j)}$ is the jth scaled exponent to be used for correlation or other signal processing and $Ex_{(j)}$ is included as the next incremental exponent in the integration cycle.

$$\text{If } Ex_{(j)} > (\overline{Ex}_{(j-1)} + T)$$

then $$Es_{(j)} = \overline{Ex}_{(j-1)}$$

and $\overline{Ex}_{(j-1)}$ is recirculated through the integrator as the next incremental exponent in the integration cycle.

In a preferred embodiment of this invention, the threshold quantity T is an exponent of two. A preferred value for the exponent is also two. Thus if the true exponent of a quantized signal sample exceeds the sum of the present integrated exponent value plus a threshold value, then the present integrated exponent value is substituted for the true exponent. Use of a threshold value such as $2^2$ permits a normally expected 4:1 variation in the seismic signal-level before the signal is downwardly scaled. The scale factor is the difference between the true exponent and the present integrated exponent value, expressed as a power of two.

At the beginning of a wavetrain of seismic signals, a time history of previously integrated exponents is lacking. Accordingly, in another aspect of this invention, the initial output of the integrator $\overline{Ex}_{(j-1)}$ is preset to an initial level. The level is determined in accordance with the expected average level of the first arriving seismic signals.

DETAILED DESCRIPTION OF THE INVENTION

Figure 1:
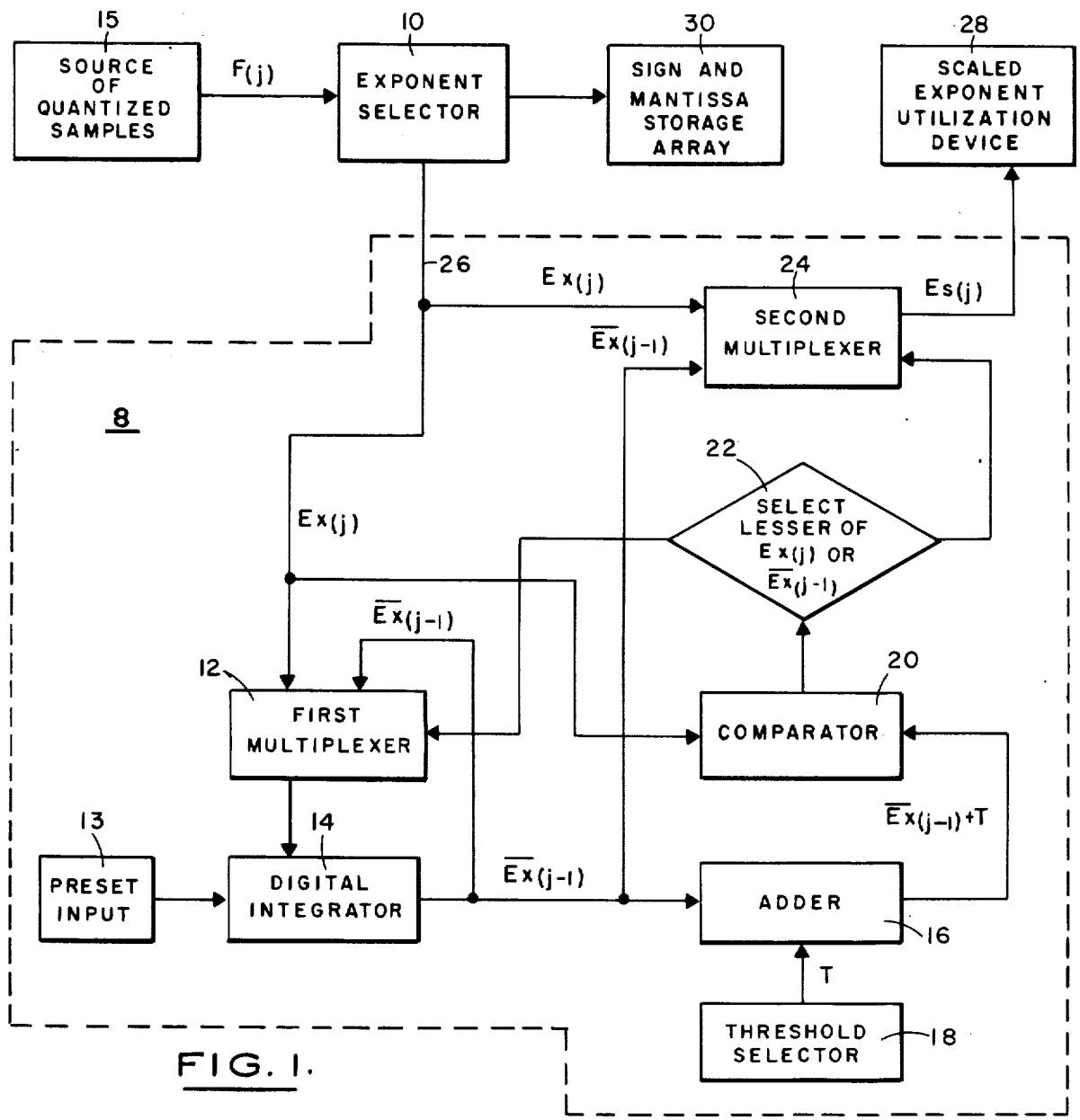
FIG. 1 illustrates schematically a flow diagram of an apparatus for suppressing noise spikes.

The noise-suppressing apparatus 8 illustrated in FIG. 1 consists of an exponent selector 10, a first multiplexer 12, a preset input 13, and a digital integrator 14. A source 15 such as a seismic data acquisition system provides sequential digital samples of a seismic wavetrain to the input of exponent selector 10.

Connected to the output of integrator 14 is an adder 16, a threshold selector 18, and a second multiplexer 24. Adder 16 is interconnected with a comparator 20 which includes decision-making logic 22. The output of second multiplexer 24 may be connected to an exponent utilization device 28, such as the digital logarithmic correlator briefly described above.

The dynamic range of seismic signals is such that the binary exponent can be expressed by a 4-bit word, providing a dynamic range of 90 db ($2^0$ to $2^{15}$). Adder 16 may be a TI Ser. No. 7483, four-bit full adder manufactured by Texas Instruments, Inc. Preset input 13 and threshold selector 18 are simple BCD thumbwheel switches such as the Series 300 Digiswitches made by Digitron Company of Pasadena, California. Integrator 14 may be a Digital Differential Analyzer as described in my copending application, Ser. No. 296,457, now abandoned, assigned to the same assignee. The integrator 14 may also be of a type discussed on page 256 of "Digital Computer and Control Engineering" by R. S. Ledley, published by McGraw-Hill Book Co.

Figure 2:
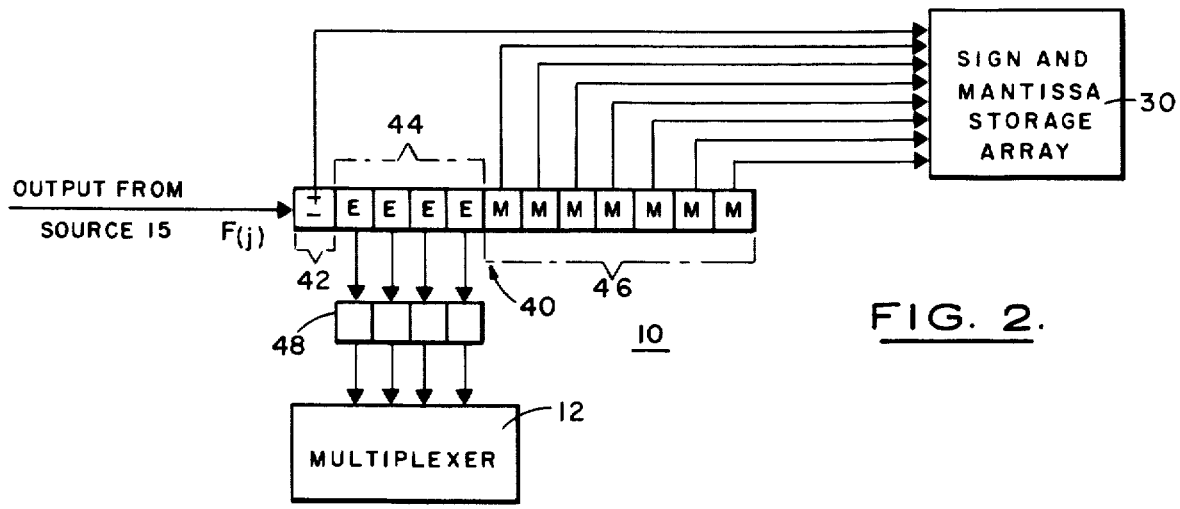
FIG. 2 is a schematic diagram of the exponent-selection circuitry shown in FIG. 1.

Exponent selector 10 is illustrated in detail in FIG. 2. It consists of a shift register 40 and a 4-bit buffer register 48. Shift register 40 is a serial-in, parallel-out shift register. The capacity of register 40 is shown for simplicity as 12 bits, but in practice a capacity of up to 32 bits may be used.

At a first sample time, a floating-point digital data sample is transferred serially from source 15 into shift register 40. The sign bit is deposited in the left-most bit position. The next four bit positions 1–4 constitute the exponent field 44. Mantissa values, M, are deposited in the remaining seven bit positions that form mantissa field 46.

At the next sample time the sign and mantissa fields are transferred in parallel to a sign and mantissa storage array 30 and the four exponent bits are sent in parallel to the parallel-in, parallel-out buffer register 48 for subsequent transfer into the noise-spike suppressing apparatus.

In FIG. 1, the data-flow paths are shown for simplicity as single lines. In practice, however, the data bits are transferred in parallel over multiple lines as represented in FIG. 2.

In operation of the apparatus, at initial sample time $t_{(0)}$, say at the beginning of a recording cycle, no seismic signals have as yet been received by the source 15. Accordingly, integrator 14 is empty and must be initialized. For this purpose, preset input 13 loads an initial digital exponent $\overline{Ex}_{(0)}$ that has a magnitude approximating the expected level of the first-arriving seismic signals. All exponents are binary exponents: they are a power of 2.

Initial exponent $\overline{Ex}_{(0)}$ is sent from the output of integrator 14 into adder 16 where it is added to a threshold quantity T, which was previously loaded into adder 16 by threshold selector 18. The sum ($\overline{Ex}_{(0)} + T$) is then loaded into comparator 20.

At first sample time $t_{(1)}$, a first digital data sample $F_{(1)}$ from source 15 enters exponent selector 10 where the true exponent $Ex_{(1)}$ is separated from the sign and the mantissa of the floating-point digital sample. True exponent $Ex_{(1)}$ now appears on output line 26 of exponent selector 10. Output line 26 is connected to the inputs of first and second multiplexers 12 and 24, and to the input of comparator 20. The sign and mantissa of digital sample $F_{(1)}$ are stored for future use in a suitable storage device 30, such as a conventional core memory. Each multiplexer can be a TI Ser. No. 74157 4×4 multiplexer, and the comparator can be a Ser. No. 7485 four-bit comparator, both manufactured by Texas Instruments.

The exponent $Ex_{(1)}$ is compared with ($\overline{Ex}_{(0)} + T$) in comparator 20. If $Ex_{(1)}$ is equal to or less than ($\overline{Ex}_{(0)} + T$), select logic 22 (an integral part of comparator 20) commands first multiplexer 12 to send $Ex_{(1)}$ to integrator 14 to be included as the first increment of the next integration cycle. Second multiplexer 24 is ordered to accept $Ex_{(1)}$ as the first scaled exponent $Es_{(1)}$ for use by an exponent utilization device 28, such as a logarithmic correlator. If $Ex_{(1)}$ is greater than ($\overline{Ex}_{(0)} + T$), then $\overline{Ex}_{(0)}$ is recirculated through the integrator and $\overline{Ex}_{(0)}$ is also introduced to the second input of multiplexer 24 to be used as the scaled exponent $Es_{(1)}$.

In the general case, therefore, at any sample time $t_{(j)}$, there is a true exponent $Ex_{(j)}$ and a present value of the integrated exponents plus threshold ($\overline{Ex}_{(j-1)} + T$). If $Ex_{(j)} \leq (\overline{Ex}_{(j-1)} + T)$, then $Es_{(j)} = Ex_{(j)}$. But, if $Ex_{(j)} > (\overline{Ex}_{(j-1)} + T)$, then $Es_{(j)} = \overline{Ex}_{(j-1)}$.

The present value of the integrated exponents $\overline{Ex}_{(j-1)}$, as used in the specification and claims, is defined as the quantity existing at the output of the integrator at the jth sample time, $T_{(j)}$.

In a preferred embodiment of this invention, the threshold quantity T is 2. The threshold quantity is a binary exponent. Therefore, adding 2 to the integrated exponents is equivalent to allowing the true exponent to vary over a 4:1 ($2^2$) range before subjecting the true exponent to scaling. Experience shows that normal seismic data levels usually vary over a 4:1 range around an average level. Signals whose level exceeds the 4:1 range are attributable to noise spikes.

The desired scaling factor is proportional to the difference between the true exponent $\overline{Ex}_{(j)}$ and the quantity representing the present value of the integrated exponents $Ex_{(j-1)}$. Scaling occurs only if the true exponent exceeds the sum of the integrated exponents plus the threshold value.

For example, let $\overline{Ex}_{(j-1)} = 4$, $T = 2$, and $Ex_{(j)} = 14$. The scale factor is $14 - 4 = 10$. A binary exponent of 10, i.e., ($2^{10}$) is 1024 in base 10 notation. Therefore, if $\overline{Ex}_{(j-1)}$, in place of $Ex_{(j)}$, is accepted as the scaled exponent $Es_{(j)}$, then the signal level for the sample at time $t_{(j)}$ will be reduced to 1/1024 of its actual level.

While this invention has been described with particular application to seismographic exploration, it can be applied to communications and other arts.

What is claimed is:

1. An apparatus for scaling down extreme-valued members of a discrete time series consisting of a set of floating-point numbers, each number including a sign, a true exponent $Ex_{(j)}$, and a mantissa, said apparatus including:

an exponent selector having an input adapted to sequentially receive said numbers and to provide to its output only the true exponents $Ex_{(j)}$ of said numbers;

first and second multiplexers, each multiplexer having a first input, a second input and an output, the first inputs of said multiplexers being connected to the output of said exponent selector;

a digital integrator having an input connected to the output of said first multiplexer and having an output connected to the second input of said second multiplexer, said integrator being adapted to integrate exponents with respect to time and to provide at its output a present value $\overline{Ex}_{(j-1)}$ of the integrated exponents;

a feedback loop interconnecting the output of said integrator with the second input of said first multiplexer;

an adder having an input connected to the output of said integrator, said adder adding a constant threshold quantity T to said present value $\overline{Ex}_{(j-1)}$ to form the sum ($\overline{Ex}_{(j-1)} + T$); and a comparator interconnected between the output of said exponent selector and the output of said adder, for determining the lesser of the quantities $Ex_{(j)}$ and ($\overline{Ex}_{(j-1)} + T$), said comparator including control logic for activating the first inputs of said first and second multiplexers thereby to receive the true exponents $Ex_{(j)}$ when $Ex_{(j)}$ is the lesser quantity, and for activating the second inputs of said first and second multiplexers thereby to receive $\overline{Ex}_{(j-1)}$ when ($\overline{Ex}_{(j-1)} + T$) is the lesser quantity, whereby the output of said second multiplexer provides a desired scaled exponent $Es_{(j)}$.

2. The apparatus of claim 1 wherein said preselected threshold quantity T is an exponent to the base two.

3. The apparatus of claim 2, wherein said exponent is 2.

4. The apparatus of claim 3 and including means to initiate said integrator means.

5. The apparatus of claim 4 wherein said time series is a digital representation of a seismic wavetrain.

* * * * *